J. JAEGER.
MACHINE FOR MOLDING BLOCKS.
APPLICATION FILED MAY 21, 1907.
No. 899,168.
Patented Sept. 22, 1908.
5 SHEETS—SHEET 1.
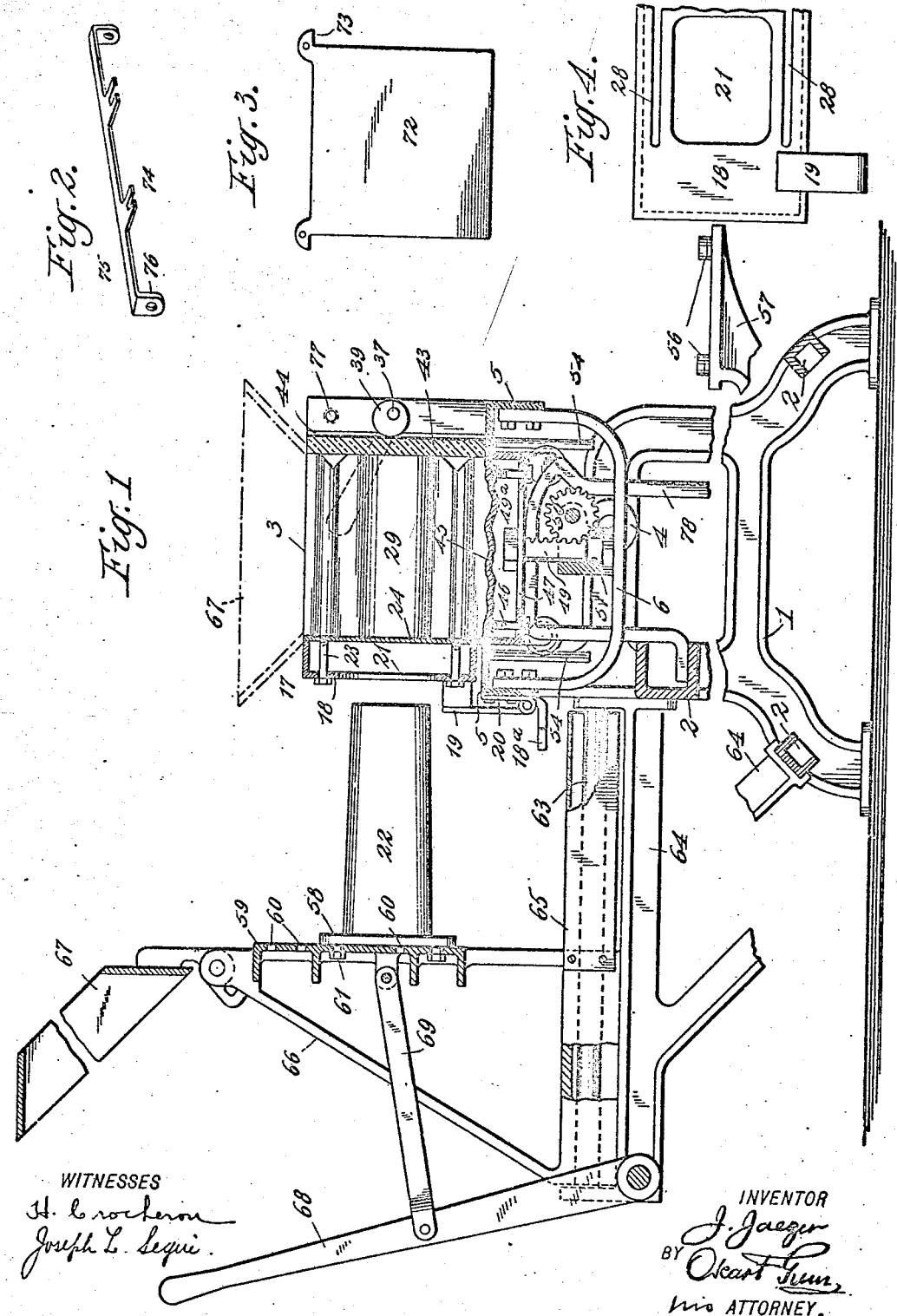
WITNESSES
H. Crocheron
Joseph L. Segui
INVENTOR
J. Jaeger
BY Oscar Gunz
his ATTORNEY.

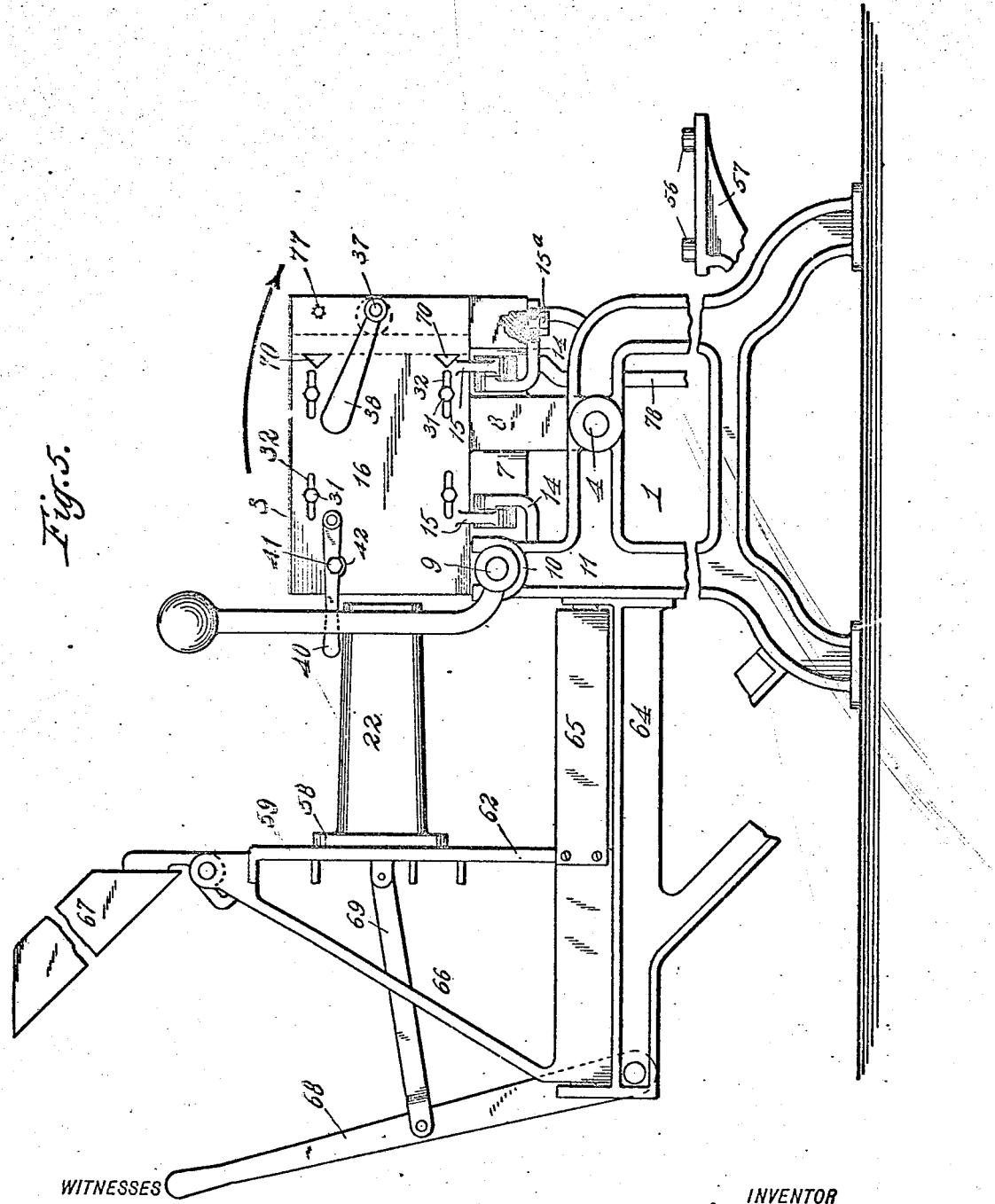

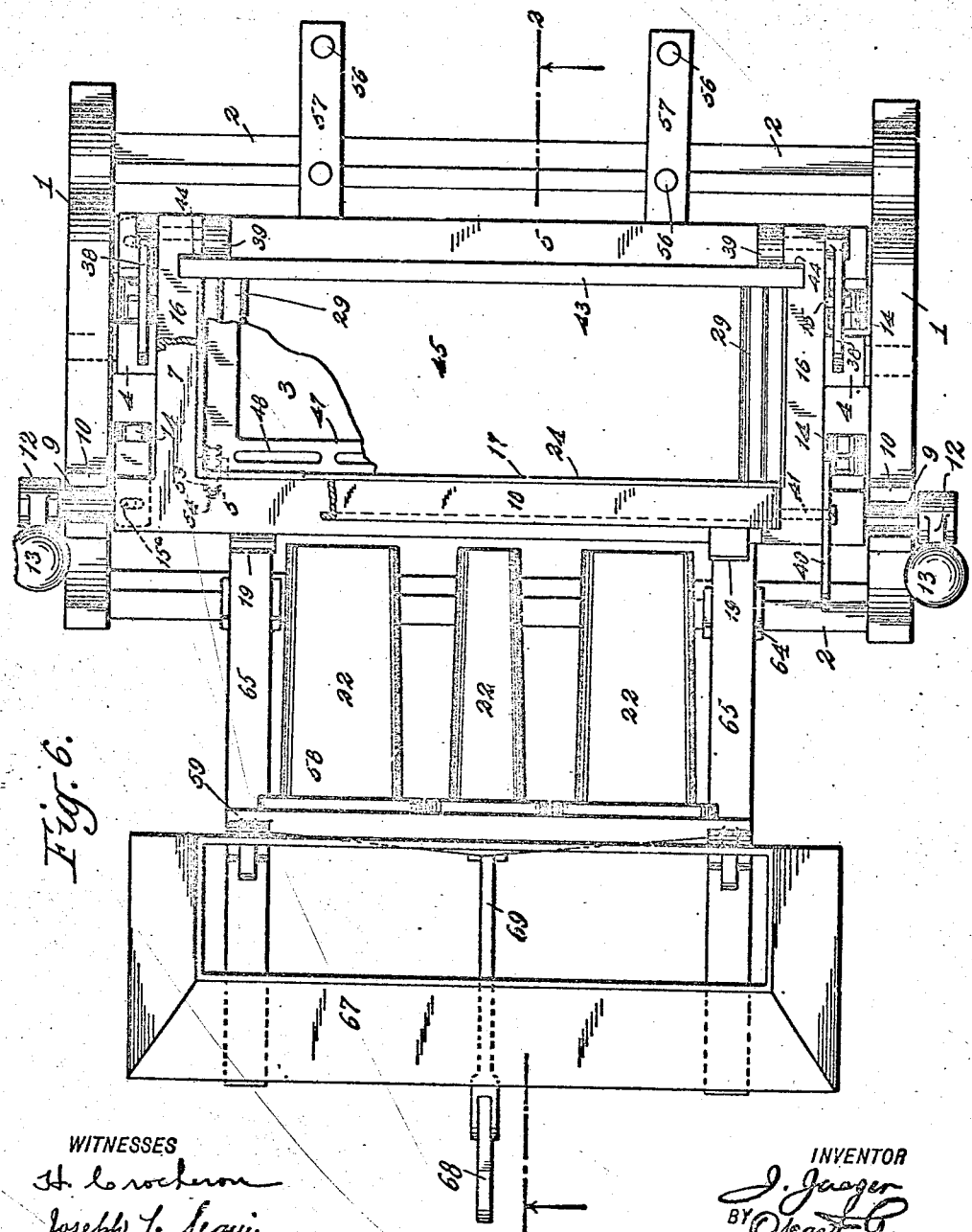

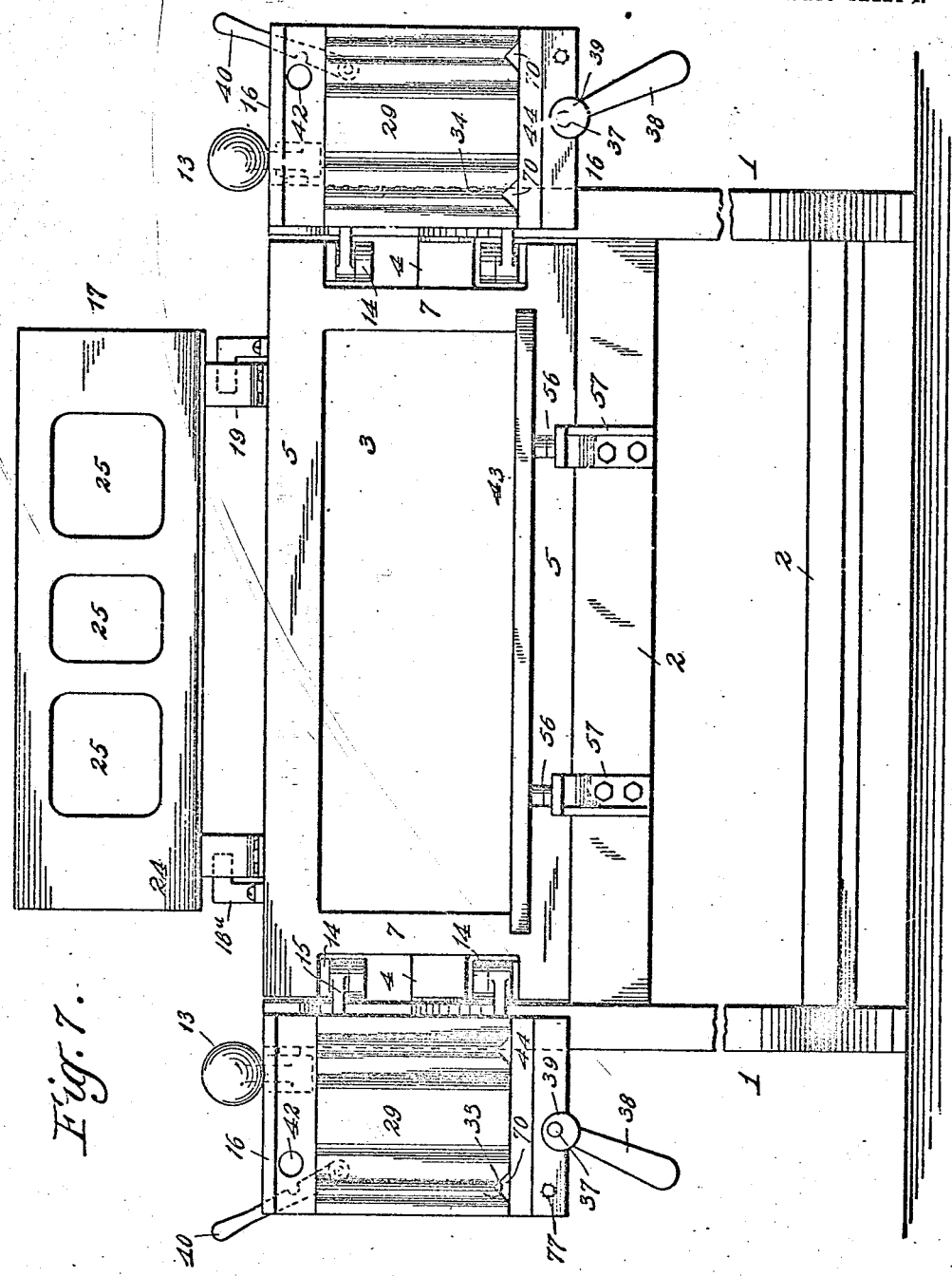

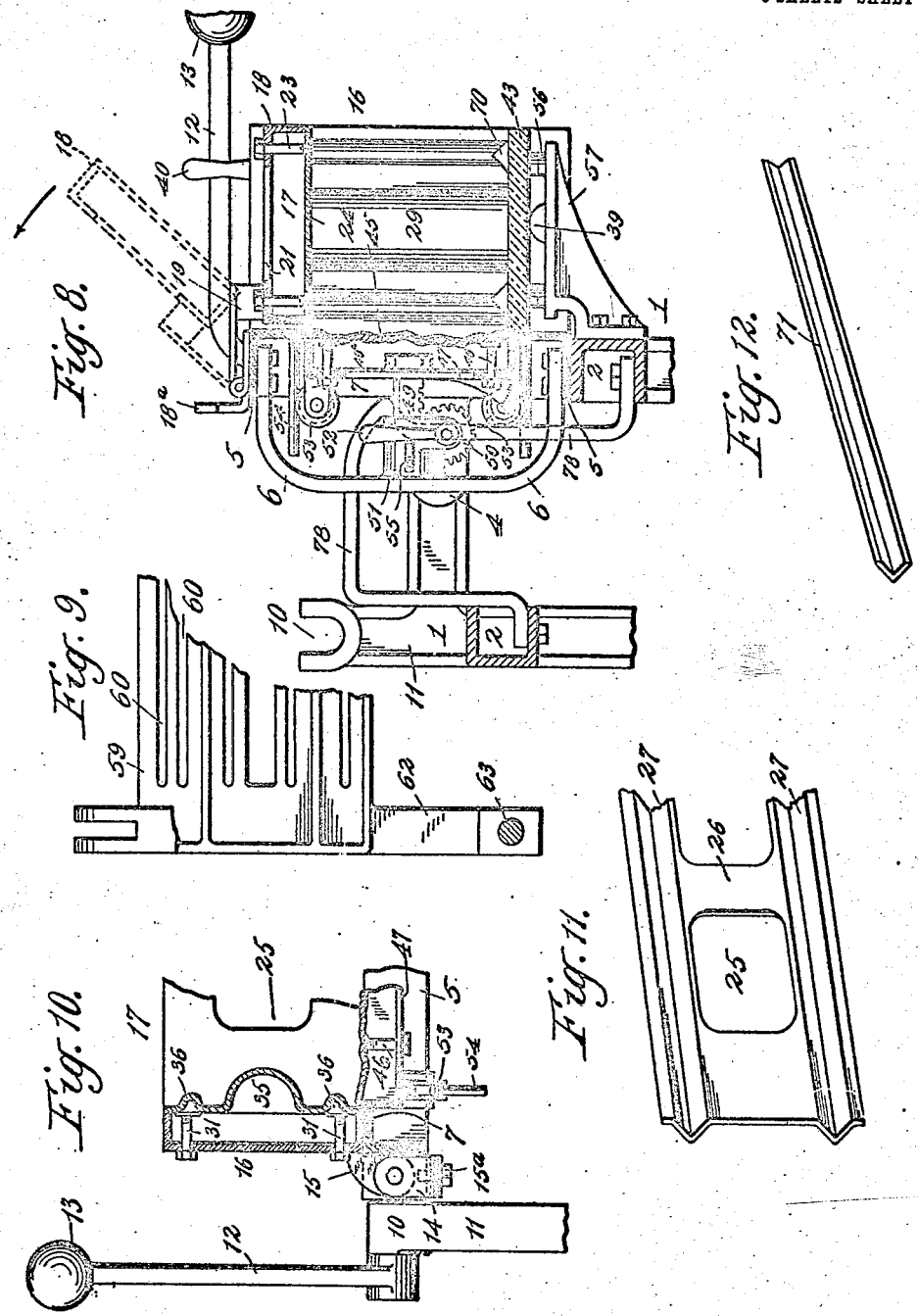

UNITED STATES PATENT OFFICE.

JULIUS JAEGER, OF RUTHERFORD, NEW JERSEY.

MACHINE FOR MOLDING BLOCKS.

No. 899,168.   Specification of Letters Patent.   Patented Sept. 22, 1908.

Application filed May 21, 1907. Serial No. 374,893.

*To all whom it may concern:*

Be it known that I, JULIUS JAEGER, a citizen of the United States, and resident of Rutherford, in the county of Bergen and State of New Jersey, have invented certain new and useful Improvements in Machines for Molding Blocks, of which the following is a specification.

The object of my invention is to provide a new and improved machine for molding blocks, which is simple in construction, is adapted for making a single block with a molded face or a number of such blocks in one operation, the parts of which machine are adjustable for different sizes of blocks and which machine is so constructed that it can be opened up easily and rapidly for removing the freshly molded block without any injury whatever to the latter, thus permitting of great speed of operation.

In the accompanying drawings, in which like letters of reference indicate like parts in all the figures: Figure 1 is a vertical longitudinal sectional view of my improved molding machine on the line 2—2 of Fig. 6, parts being broken away. Fig. 2 is a perspective view of the partition spacing bar. Fig. 3 is a side view of a removable partition. Fig. 4 is a rear view of the frame plate of the rear wall of the mold box, parts being broken away. Fig. 5 is an end elevation of the machine, parts being in section and other broken away. Fig. 6 is a plan view, parts being in section and others broken away. Fig. 7 is a front elevation, the mold box being swung down and open and the mold board omitted, parts being broken away. Fig. 8 is a vertical transverse sectional view through the mold box, lowered; parts being broken away. Fig. 9 is a rear elevation of part of the core plate. Fig. 10 is a vertical longitudinal sectional view showing a modified gate lining plate. Fig. 11 is a perspective view of a modified lining plate for the rear wall of the mold box, parts being broken away. Fig. 12 is a perspective view of one of the bars for making grooves in that face of the block formed on the inner face of the slate slab, forming the removable front of the mold box.

The entire machine is mounted on a frame composed of two side frames 1 united by bars 2. The mold box 3 is pivoted to each side frame 1 at 4 to swing in the direction of the arrow and in the reverse direction, see Fig. 5. The mold box is constructed with a base frame composed of front and rear angle side bars 5 united by a curved cross bar 6 and end bars 7, the end bars having downwardly extending arms 8 by which the mold box is pivoted to the base frame 1. At each end of the base frame of the mold box, at the rear, a stud 9 is fixed, which can pass into a fork 10 on the top of the rear standard 11 of each side frame 1, and to the outer end of each stud an upwardly extending arm 12 is secured which is provided at its upper end with ball shaped or other handle 13. When the mold box is in raised position, as shown in Fig. 5, for receiving the mixture, the studs 9 rest in the forks 10 and thus support the mold box at the rear. An L shaped hinge bracket 14 is held adjustably by a screw 15ª to the underside of each side bar 5 at each end thereof and said brackets project up between the ends of the side bars 5 adjacent to the end bars 7 and to the free ends of the brackets the downwardly extending lugs 15 on the end gates 16 of the mold box are pivoted. The rear wall 17 of the mold box is formed of a frame 18 provided with downwardly extending hinge lugs 19, pivoted to hinge lugs 20 secured to the back of the rear side bar 5 so as to permit of swinging said rear wall 18 rearward or upward as shown in dotted lines in Fig. 8, and against angle stops 18ª. This frame has openings 21 for the passage of the cores 22. By means of screws 23 the lining plate 24 is held to the frame 18 and this lining forms the inner rear wall of the mold box and has openings 25 for the passage of the cores 22. This lining plate 24 can be detached and replaced by another as for example 26 shown in Fig. 11, which is provided with longitudinal V shaped grooves 27 for forming V shaped longitudinal ridges on the top of the completed block. To permit of adjusting these lining plates the screws 23 are passed through longitudinal slots 28 along the top and bottom edges of the frame 18 as shown in Fig. 4. In a similar manner lining plates 29 or 30 are held adjustably on the inner faces of the end gates 16 by screws 31 passed through slots 32 at the top and bottom of these end gates. The linings 29 are provided with V shaped ridges 33 or V shaped grooves 34 for forming V shaped ridges on one end of the block and V shaped grooves on the other end. The lining plates 30 are provided with projections 35 and 36 for forming corresponding grooves or recesses in the ends of the block. A short shaft 37 is mounted in the front part of each end gate 16 and on the outer end of such shaft a handle 38 is secured and on the inner end an eccentric or locking cam 39. To the outer side of each end gate a locking latch 40 is pivoted which can engage a headed bolt or pin 41 projecting from the end of the rear wall 17 of the mold box and adapted to pass through a hole 42 in the end gate, for the purpose of locking the end gate in place against the end of the rear wall of the mold box.

The front of the mold box is formed of a slate slab 43 resting on edge on the front bar of the mold box base frame and the ends of said slab 43 pass into vertical grooves 44 in the inner sides of the end gates. By turning or swinging the handles 38 rearward, the cams 39 press the inner faces of the end parts of the slab 43 against the inner sides of the grooves 44 thus locking such slab in place. The mold board 45 which has a surface finish corresponding to the desired surface appearance of the front of the finished block, is secured by screws 46 to a bottom frame 47 fitting within the opening in the base of the mold box and having slots 48 in its horizontal side parts through which the screws 46 pass to permit of securing mold boards of different sizes or patterns or composed of several pieces to the base 47. The bottom frame or base has a cross bar 49ª from which a rack 49 extends downward and engages a pinion 50 mounted in lugs of a guide 51 projecting upward from the curved cross bar 6 uniting the front and rear side bars 5, as shown in Figs. 1 and 8. The shaft of this pinion 50 has a handle 52 by means of which the pinion can be turned and thereby the bottom and mold board moved into and out of the mold box, the bottom being guided by rollers 53 running on rods 54 extending downward from the base frame of the mold box. A locking spring 55 engaging the handle 52 serves for locking the pinion 50 and the bottom of the mold box in place. When the mold box is swung 90 degrees to the front the studs 9 pass out of the forks 10 and the front of the slab 43 now rests upon cushion lugs 56 on the upper edges of forwardly extending brackets 57 of the main supporting frame as shown in Fig. 8. The cores 22 are provided with base flanges 58 which rest upon the front of a vertical movable core holding plate 59 having a series of slots 60 through which screws 61 are passed into the base flanges of the cores, thus permitting of readily adjusting or interchanging the cores. The core holding plate has downwardly extending legs 62 through which guide rods 63 pass loosely, which rods are held horizontally above brackets 64 on the rear of the main supporting frame these rods being covered by casings 65 attached to the legs 62 and from which casing the plate 59 is braced by braces 66. A hopper 67 is pivoted to the top of the core holding plate 59 and a pivoted handle lever 68 is connected by a pivoted rod 69 with the core holding plate. The end gates 16 have triangular openings 70 through which V shaped strips 71 can be inserted to rest longitudinally on the inner surface of the slab 43 when that face of the block formed on said inner surface of the slab is to have longitudinal V shaped grooves. Removable transverse partitions 72 having lugs 73 can be placed into the mold box when a number of smaller blocks are to be made in one operation, and these partitions are held and guided by lugs 74 in a removable gage bar 75 having bent apertured ends 76 through which pins or screws can be passed into apertures 77 in the ends of the end gates 16. When the mold box is in raised position its bottom rests upon the transverse supports 78 on the main base frame, which supports 78 are curved down at the front to permit swinging down the mold box.

The operation is as follows:—The parts being in the positions shown in Fig. 1 the cement mixture for the front of the block, which is of better quality than that for the remainder of the block, is spread on the upper surface of the mold board 45 and carefully tamped. Then the core plate is moved forward to bring the cores 22 into the mold box and the hopper 67 is swung into the position shown in dotted lines, Fig. 1, and the balance of the cement or other mixture is filled into the mold, carefully tamped and finally struck off smooth on top. The cores are withdrawn rearward and brought into the position shown in Fig. 1 and then the mold box is swung in an arc of ninety degrees and brought into the position shown in Figs. 7 and 8, the slate slab 43, which is now at the bottom, resting on the brackets 57. The pinion 50 is turned to withdraw the mold board 45 from the box uniformly throughout the area of this board. Then the cams 39 are disengaged from the slab 43, the latches 40 are disengaged from the pins 41 and the end gates are swung outward as shown in Fig. 7 and finally the rear wall 17 which is now at the top is swung up until it rests against the stops 18ª as is also shown in Fig. 7. The block is now entirely disengaged from the mold box and rests solely upon the slab 43 upon which it is carried away for curing. The parts of the mold box are restored to their original position, the mold box is swung back into the position shown in Fig. 1, another slab 43 is placed in position and locked in place and the above described operation for making a block can now be repeated.

Having described my invention what I claim as new and desire to secure by Letters Patent is:

1. A machine for making molded blocks having a mold box pivoted to swing in its entirety on an arc and provided with a mold board separate from any other part of the mold box, which mold board is mounted to move uniformly throughout its area into and out of the box, combined with means for so moving the mold board and a hinged back for the box, hinged ends for the box, and a wholly detachable front for the box, substantially as set forth.

2. A machine for making molded blocks having a mold box and a mold board in said box separate from any other part of the box which mold board is mounted to move uniformly throughout its area into and out of the box, combined with means for so moving the mold board, substantially as set forth.

3. A machine for making molded blocks having a mold box provided with a mold board separate from any other part of the box and movable into and out of the box and a rack and pinion gear for so moving the mold board, substantially as set forth.

4. A machine for making molded blocks, having a mold box provided with a mold board separate from any other part of the box and movable into and out of the box, a rack and pinion gear for so moving the mold board, rollers on the mold board and rods on which the rollers run, substantially as set forth.

5. In a machine for making molded blocks, the combination with a supporting frame, of a mold box pivoted on the same and supports for the mold box on said frame, which supports are curved downward at the front, to permit of swinging down the mold box on a support substantially as set forth.

6. In a machine for making molded blocks, the combination with a supporting frame, of a mold box, downwardly extending arms on the mold box pivoted to the supporting frame, end studs at the rear of the box, forks on the supporting frame for receiving said studs and supports for the box on said frame which supports are curved downward at the front, to permit of swinging down the mold box on a support substantially as set forth.

7. In a machine for making molded blocks, the combination with a supporting frame, of a mold box pivoted on the same, a removable mold board at the bottom of said box, and means for moving said removable mold board uniformly throughout its area into and out of the box hinged end gates, a removable back having core openings, a wholly detachable front plate which forms the front wall of the mold box, a vertical core plate mounted to move horizontally on the supporting frame and cores projecting horizontally from said core plate toward the mold box, substantially as set forth.

8. In a machine for making molded blocks, the combination with a mold box having a detachable front plate said box having end plates and these end plates being provided with openings directly behind said detachable front plate and removable bars which are passed through said openings in said end plates, so that these bars, when passed through said openings in the end plates, will be adjacent to the inner surface of the detachable front plate, substantially as set forth.

Signed at Rutherford in the county of Bergen and State of New Jersey this 27th day of April A. D. 1907.

JULIUS JAEGER.

Witnesses:
F. JAEGER,
CHAS. E. TOLHURST.